Aug. 7, 1956
E. E. MONTROSS
2,757,416
METHOD FOR HANDLING AND MELTING NYLON
TO BE USED IN MOLDING ARTICLES
Filed Sept. 12, 1950
3 Sheets-Sheet 1
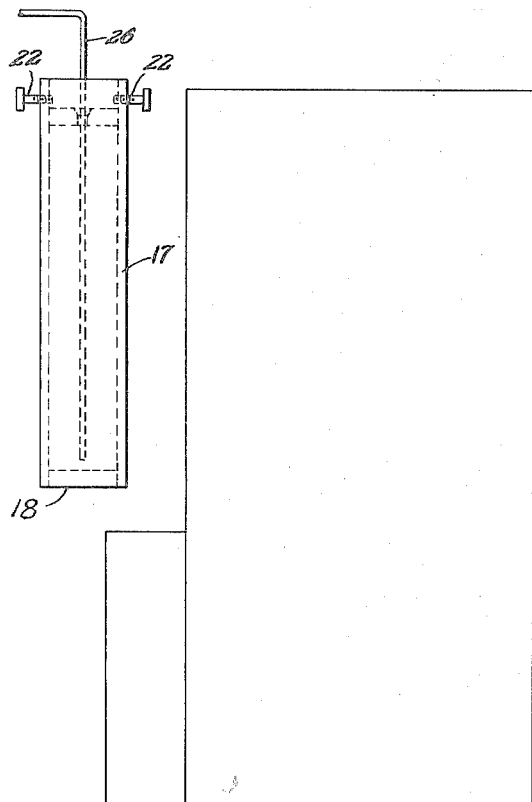
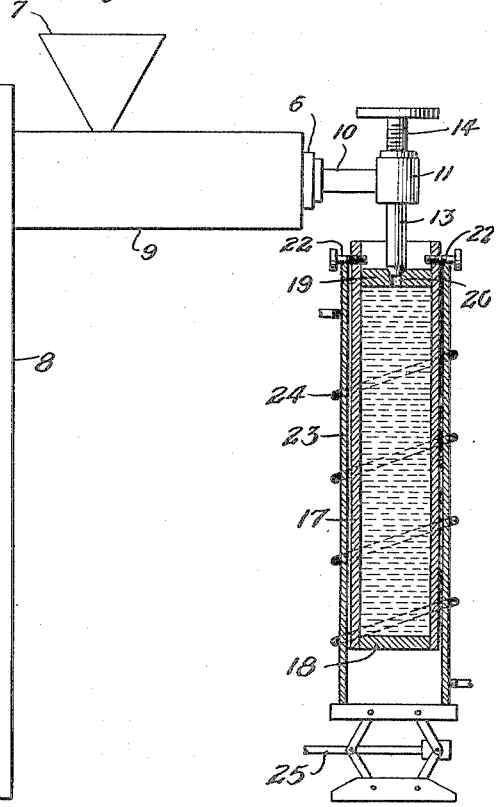
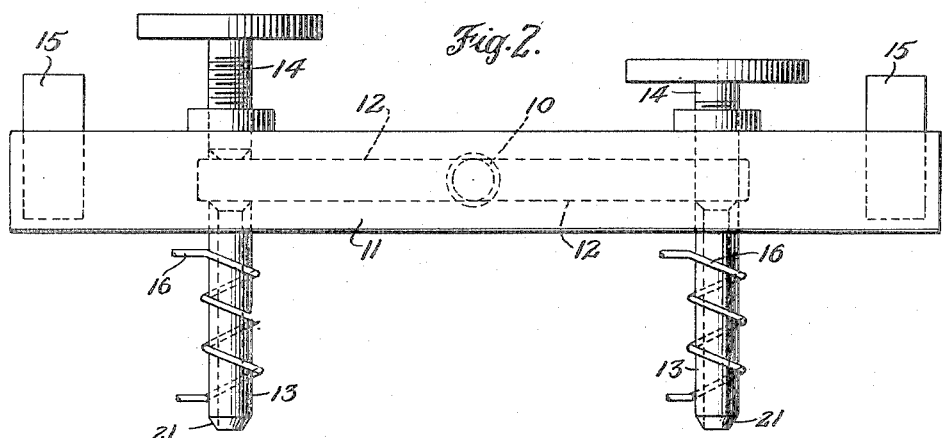
INVENTOR
Eugene E. Montross
BY
ATTORNEYS

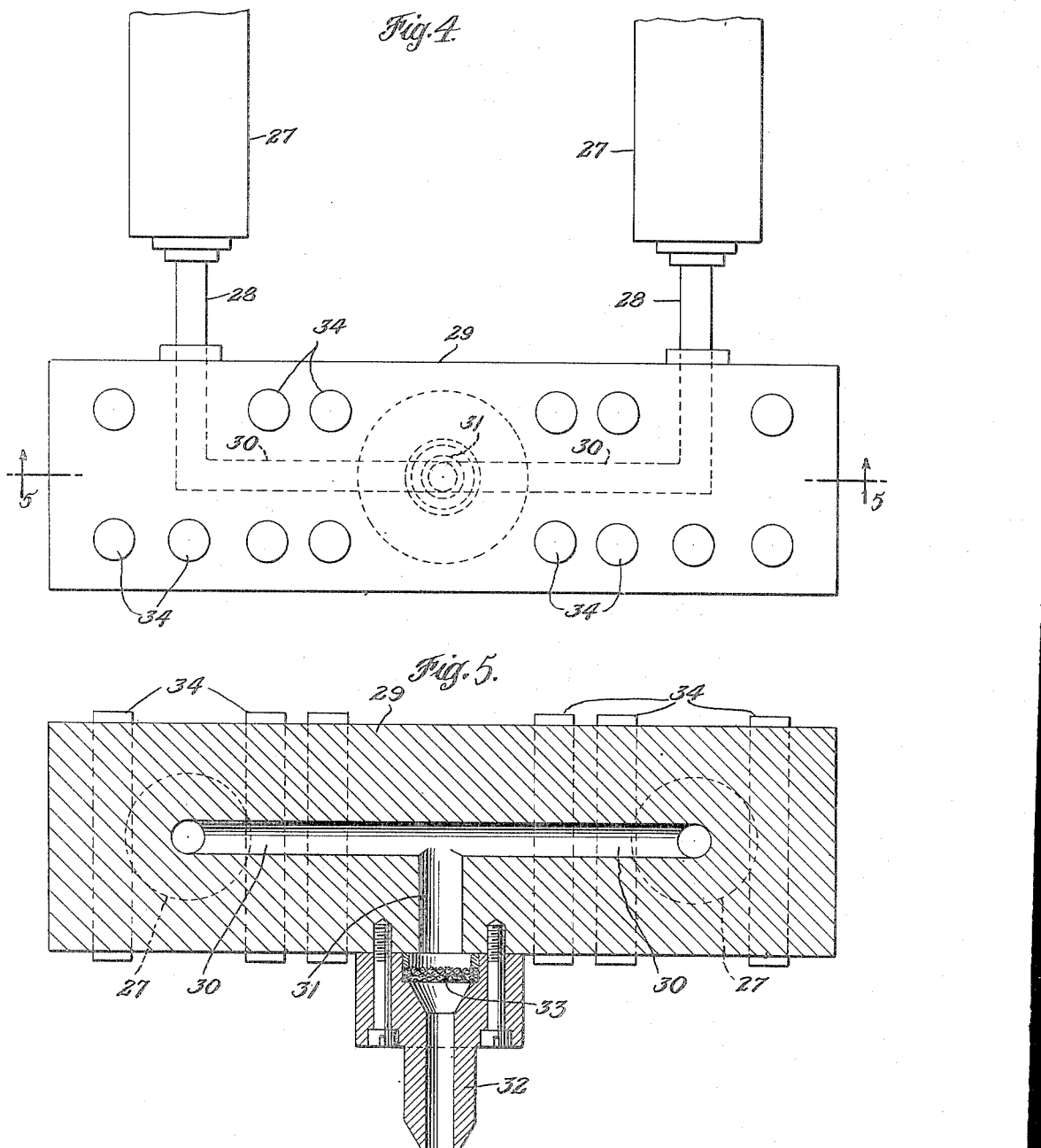

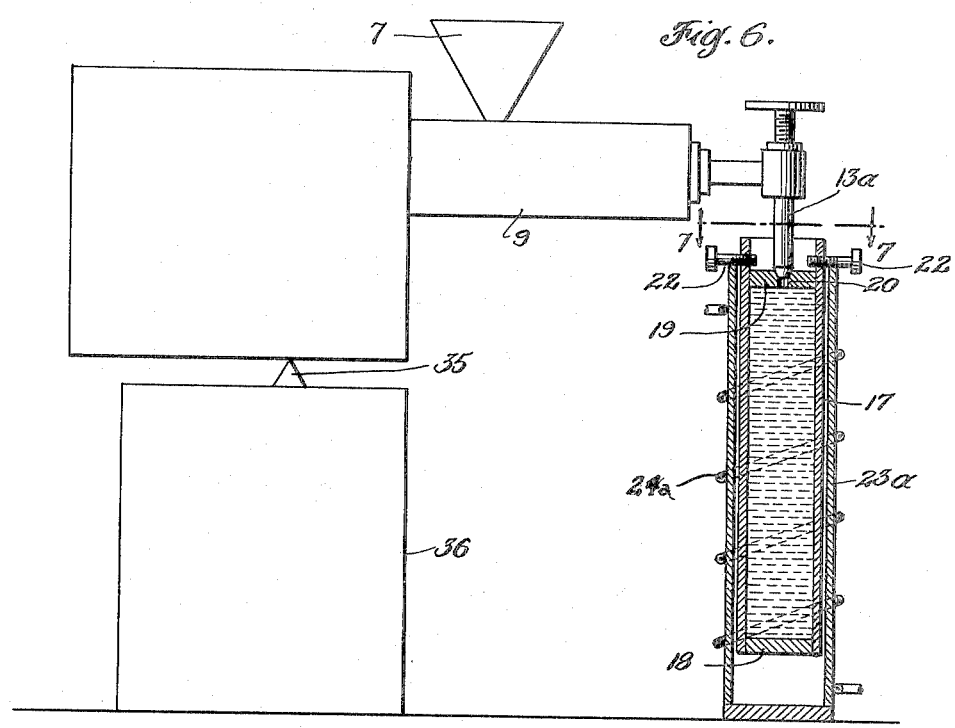
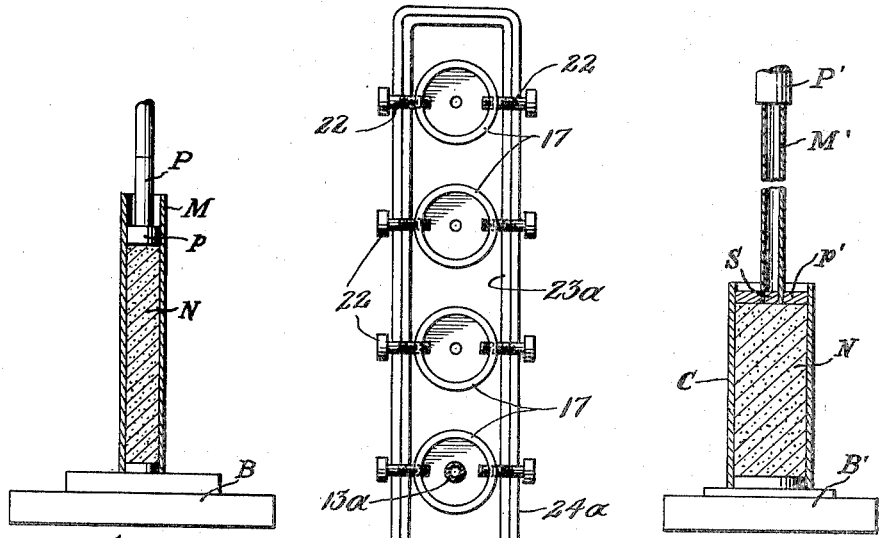

United States Patent Office 2,757,416
Patented Aug. 7, 1956

2,757,416
METHOD FOR HANDLING AND MELTING NYLON TO BE USED IN MOLDING ARTICLES

Eugene E. Montross, West Wyomissing, Pa., assignor to The Polymer Corporation, Reading, Pa., a corporation of Pennsylvania Application September 12, 1950, Serial No. 184,390

3 Claims. (Cl. 18—58)

This invention relates to the formation of articles from synthetic linear polyamides, especially the high melting polyamides such as polyhexamethylene adipamide and polyhexamethylene sebacamide, commonly known to the trade as nylon.

The invention is especially concerned with methods for use in the handling and melting of nylon and also in the feeding of the melted nylon to equipment for use in performing the molding operations, such latter equipment comprising either the molds themselves or intermediate containers from which the nylon is transferred into the molds.

Because of the various characteristics of these nylon materials, and notably the high melting polyamides, it is of importance to avoid contact with air while the material is melted, to thereby avoid oxidation and/or degradation of the nylon. It is further of importance to provide for accurate control of the temperature of the material during the melting and while in the molten condition, and especially to avoid localized overheating which tends to degrade the material.

Since the nylon materials are characterized by a relatively low coefficient of thermal conduction, heat transfer to and into masses of the material to be melted is relatively slow, as a result of which substantial time is required for the heat to penetrate any mass of the material of substantial section. If an attempt be made to decrease the melting time by increasing the temperature of the heating source, this tends to produce localized overheating with consequent degradation of the material.

The present invention provides a method for effectively meeting this problem and thereby provide for relative rapid melting of the nylon without, however, overheating in localized surface layers or areas, these advantageous results being achieved even where relatively large masses of material are required to be handled in order to effect the molding of relatively massive articles.

Briefly, according to the invention, a column of relatively small cross section, of flake or granular nylon is advanced and concurrently heated, preferably by a screw feed device, so as to form a stream of melted nylon and this stream is charged into the equipment used for or in connection with the molding operation itself through a specially formed nozzle structure, as will further appear. The nozzle structure provides for the feed or delivery of the melted material without substantial contact with the air and under carefully controlled temperature conditions. In the preferred arrangement the discharge nozzle or nozzles are so constructed as to cooperate with the charging ports either of the molds themselves or of intermediate containers (from which the nylon is ultimately transferred to such molds), the cooperating parts of the nozzle and molds or containers being arranged to permit convenient engagement and disengagement thereof while at the same time substantially precluding contact of the melted material with the air. In this way even relatively large molds or containers may be charged without encountering substantial oxidation or degradation of the nylon.

How the foregoing and other objects and advantages are attained will appear more fully from the following description referring to the accompanying drawings, in which—

Figure 1 is an elevational view of the melting and charging equipment preferably employed according to the invention, certain parts being shown in outline only, the view also including an axial sectional illustration of a mold or container associated with the melting and charging equipment;

Figure 2 is an enlarged elevational view of the nozzle structure incorporated in the arrangement shown in Figure 1;

Figure 3 is an elevational view on the scale of Figure 1, showing an operation preferably employed immediately preceding charging;

Figure 4 is a fragmentary view of a plurality of melting devices associated with a single nozzle structure of modified form as compared with the nozzle structure shown in Figures 1 and 2;

Figure 5 is a sectional view through the nozzle structure of Figure 4 taken as indicated by the line 5—5 on Figure 4;

Figure 6 is a view similar to Figure 1 but illustrating modified arrangement;

Figure 7 is a view of a portion of the equipment of Figure 6, taken as indicated by the line 7—7 on Figure 6;

Figure 8 is a sectional view of a charged cylinder associated with equipment for performing a pressure molding operation directly in the cylinder; and Figure 9 is a sectional view of a cylinder associated with a mold and equipment for effecting a pressure molding operation in which the nylon is delivered from the cylinder into the mold.

Referring first to Figure 1, the equipment preferably employed for actually melting the nylon comprises a screw feed device of known type. This device includes a feed screw working in a cylinder 6, the flake or granular material being fed to the screw by delivery thereof into the feed hopper or funnel 7. The screw device is supported in any suitable manner as by the standard 8 which may serve also to mount a driving motor for the screw. The screw cylinder 6 has associated therewith heating means indicated in outline by the numeral 9 as a heating jacket surrounding the screw cylinder.

The details of the structure and arrangement of this screw device are not illustrated since they may be of known type and since they do not form a part of the present invention per se. This device, however, advances and heats a column of the nylon material, which column is of relatively small cross section, and thereby delivers a melted or molten stream of the nylon through the discharge pipe 10.

As seen in Figures 1 and 2, the discharge pipe 10 communicates with the nozzle structure which is formed of a substantial mass of metal, such as the bar 11. This bar has branch passages 12—12 formed therein, in communication with the pipe 12. The bar further has a pair of discharge nozzles 13—13 each of which is in communication with one of the passages 12—12. Controllable valves 14—14 serve to open and close the two nozzles 13—13, and provide for diverting the flow of the stream of melted nylon through one nozzle or the other. Heater elements indicated at 15—15 in Figure 2 serve to supply heat to the nozzle bar 11, and additional heater elements, preferably electrical elements, are shown at 16—16, being wound around the nozzles 13 so as to provide for transfer of heat therethrough and thus for maintenance of the desired temperature of the melted nylon flowing through the nozzles.

In Figure 1 a cylinder 17 is illustrated as associated with one of the charging nozzles 13. This cylinder has a bottom closure plug 18 and a plug 19 at its upper end which is centrally apertured as at 20 to provide a charging port. The port 20 is outwardly flared at its outer end so as to cooperate with the tapered end portion 21 of the nozzle (see also Figure 2), to thereby provide relatively close seating or fit as between the nozzle and the plug 19.

The plugs 18 and 19 are both preferably formed of a metal having a coefficient of thermal expansion somewhat higher than that of the tube 17. Thus, for example, the tube 17 may be formed of steel and the plugs 18 and 19 of bronze. In this way, with reasonably accurate machining and fitting of the plugs to the interior surface of the tube 17, these plugs may readily be inserted and removed when the plugs and cylinder are both at room temperature; but when heated the plugs expand and provide a snug fit within the cylinder, to thereby assist in the exclusion of air.

The cylinder 17 is provided with a pair of removable screws 22—22 which serve as a means of supporting the cylinder on the upper edge of the heating chamber 23. This chamber 23 is provided with heating means, such as an electrical heating element indicated at 24. The heating chamber (and thus also the cylinder 17 mounted therein) is supported at its lower end by means of an adjustable jack device 25 providing for raising and lowering the assembly with relation to the nozzle 13.

In a typical operation, a cylinder such as indicated at 17, with plugs 18 and 19 inserted therein is first preheated to a temperature above the melting point of the nylon being used. The cylinder is then flushed out with an inert gas such as nitrogen delivered into the cylinder as by a tube 26, in the manner illustrated in Figure 3. Air may escape from the interior of the cylinder through the charging port 20 around the tube 26. The preheated and flushed container is then inserted in the heating chamber 23 and the jack 25 is operated to raise the heating chamber and cylinder to bring the nozzle 13 into snug engagement with the plug 19. With appropriate adjustment of valves 14 this cylinder is then charged from the stream of melted nylon delivered from the nozzle.

Before considering certain structural and operational advantages of the nozzle and other parts of the apparatus described, it is here pointed out that the cylinder 17 with which the apparatus of the invention is adapted to cooperate may either be a mold or an intermediate container from which a mold is to be charged. Examples of molding operations performed either directly in such a cylinder or in a mold to be associated therewith are disclosed in Patent No. 2,505,807, issued May 2, 1950, to Louis L. Stott, and in copending application of Louis L. Stott, Serial No. 624,241, filed October 24, 1945, issued January 9, 1951, as U. S. Patent No. 2,537,285, corresponding to British Patent No. 641,647, published August 16, 1950, assigned to the assignee of the present application. As shown in Figure 8, the said U. S. Patent No. 2,505,807 discloses a pressure molding operation in which a pressure plunger P is brought to bear against a plug $p$ and thereby exert pressure on molten nylon N in a mold M during cooling and solidification of the nylon, the assembly being supported by press bed B. As shown in Figure 9, said British Patent No. 641,647 discloses a pressure molding operation in which a pressure plunger P' effects telescopic movement of a tubular mold M' and the connected sealing member $p'$ into a tubular container C charged with molten nylon N' to effect delivery of the molten nylon under pressure from the container into the mold, this assembly also being supported by a press bed B'. A slidable plug S advances into the mold M' just ahead of the molten nylon to minimize contact of the molten nylon with air. Still other arrangements of these types are disclosed in copending application Serial No. 166,790, filed June 8, 1950, and in copending application Serial No. 176,110, filed July 27, 1950, issued August 24, 1954, as U. S. Patent No. 2,686,935, both assigned to the assignee of the present application. Thus, it is to be understood that the apparatus and method of the present invention are adapted for use with molds and containers of various different arrangements. In general the molds or containers with which the invention is adapted to cooperate comprise cylinders having end closures one of which is provided with a charging port adapted to be engaged by a nozzle element of the apparatus of the present invention.

As will be seen from Figures 1 and 2, the delivery passages for the stream of melted nylon extending between the melting device itself and the cylinder to be charged are arranged in such manner as to provide for control of the temperature of the molten stream throughout the major portion of the extent of such passages. The employment of a nozzle bar of substantial mass, such as shown at 11 in Figures 1 and 2 is of importance in the maintenance of uniform temperature during the flow of the molten stream through the nozzle structure. It will be observed that the volume of the flow passages within the bar itself is relatively small as compared with the total volume of the mass of metal of the bar, and this mass of metal, in effect, constitutes a reservoir for heat which acts to stabilize the temperature. Heat may be transferred to the bar from the elements 15, in order to retain the bar at the desired temperature above the melting point of the nylon. The heater element 16 associated with the nozzles 13 themselves also contribute to this purpose.

As is fully brought out in the copending applications Serial Nos. 166,790 and 176,110, identified above, the preheated cylinder, for instance the cylinder 17 shown in Figure 1, is retained at the desired temperature above the melting point of the nylon by the transfer of heat therethrough during the filling operation, the heating chamber 23 and heater element 24 serving this purpose. It may also be mentioned that during the filling operation, gases in the cylinder may escape either around the plug 19 or past the nozzle 13, the fit of these parts preferably being such that in effect they are liquid tight though not completely gas tight.

It is also pointed out in connection with the general arrangement and operation above described that the invention provides for the advancing and concurrent melting of the nylon in a column of relatively small section. This is conveniently accomplished with a known type of screw feeder which provides for rapid melting of the nylon without appreciable localized overheating and also substantially without exposure of the material to air. The resulting molten stream of nylon may then be diverted for discharge through one or the other of the nozzles 13, by appropriate adjustment of valves 14, and this arrangement provides for alternate filling of cylinders brought alternately into association with the two nozzles 13. In this way the screw heater device may be operated continuously, which is of advantage for known reasons, and at the same time avoids loss of nylon which would necessarily be encountered during removal of one cylinder and replacement of another in an arrangement where only a single discharge nozzle is provided in the nozzle structure. The foregoing and other features of the invention are of especial importance in the handling, melting and charging of relatively large masses of nylon to be used in the molding of relatively massive articles.

In a typical case where polyhexamethylene adipamide (melting point about 507° F. and freezing point about 473° F.) is being used, the nylon should be heated to produce a melted stream thereof at a temperature of from about 507° F. to about 535° F., and this temperature should be maintained substantially throughout the passages of the nozzle structure. The cylinder to be charged should also be preheated and maintained at a temperature of from about 515° F. to about 550° F.

In the case of polyhexamethylene sebacamide (melting point 455° F.) the temperature of the melted stream should be from about 475° F. to about 490° F., and the cylinder should be preheated and maintained at a temperature from about 460° F. to about 500° F.

Turning now to the arrangement illustrated in Figures 4 and 5, it is first noted that as seen in Figure 4 this arrangement includes two screw heater devices indicated in outline at 27—27 and delivers streams of melted nylon through discharge pipes 28—28. The nozzle structure of this arrangement also comprises a relatively massive bar as is indicated at 29, this bar having passages 30—30 therein which are respectively connected with the pipes 28 and which merge or join in a discharge passage 31. The passage 31 in turn delivers to a single discharge nozzle 32 adapted to be used in the manner of nozzles 13 described above. In this arrangement the inlet portion of the nozzle member 32 has a chamber formed therein to receive a screen pack 33, this screen pack thus being located between the discharge point of the nozzle 32 and the point of junction of the two streams of melted nylon passing through the nozzle bar through the passages 30 therein. This location of the screen pack in this arrangement is of advantage because such location makes possible use of a screen of relatively large area, which is less subject to clogging up.

A screen pack of the kind referred to just above is also advantageously utilized in the equipment of Figures 1 and 2, although the pack may there be located at the delivery end of the screw, immediately in advance of the discharge pipe 10, which is a known location for such a pack in screw devices of this general kind.

With regard to the nozzle structures of both forms of the invention disclosed, it may be mentioned that the cross sectional flow area of the nozzle elements (13 in Figures 1 and 2, and 32 in Figures 4 and 5) is preferably smaller than the cross sectional area of the passages in advance of the discharge nozzle. This is of advantage in minimizing bubble formation within the material being fed.

In connection with the arrangement of Figures 4 and 5 it is noted that by the use of a plurality of heating and melting devices delivering to a single charging nozzle, relatively rapid charging even of a large mass of material may be effected while at the same time the flake or granular material is being melted in columns of quite small cross sectional dimension.

Heater elements 34, such as electrical heater inserts are provided in the nozzle bar 29, for the purpose described above with reference to the elements 15 shown in Figure 2.

Turning now to the modified arrangement of Figures 6 and 7, it is first noted that in many respects the arrangement is similar to that of Figure 1. Thus, Figure 6 shows the same type of container 17 as Figure 1 in position for charging from the nozzle of the extruder. The extruder itself may be of the same general type as referred to above in connection with Figure 1, but in Figure 6 the extruder is mounted as a whole upon a pivot device such as indicated at 35 arranged at the top of a suitable support 36. The pivot device 35 may comprise any suitable elongated element having an upwardly presented edge offset horizontally from the nozzle and on which the extruder as a whole may rock, so as to raise and lower the nozzle.

In the arrangement of Figures 6 and 7, moreover, the heating chamber 23a is adapted to rest directly upon the floor or other support for the equipment (instead of upon a jack such as indicated at 25 in Figure 1). This heating chamber, moreover, is of elongated plan form as clearly appears in Figure 7, so as to accommodate a plurality of containers 17 each one of which may be supported at the upper edge of the chamber by means of screws 22. This heater chamber is provided with a heating element indicated at 24a.

It is contemplated in the modified arrangement of Figures 6 and 7 that only a single delivery nozzle 13a need be associated with the extruder, and the operation here contemplated is to raise and lower the nozzle 13a, by rocking the entire extruder unit about the pivot support 35, in order to bring the nozzle into engagement with the filling aperture of any one of the containers 17. In carrying out the operation with the equipment of Figures 6 and 7 one of the containers 17 is brought into the proper position below the nozzle 13a so that upon downward movement of the nozzle it will engage the aperture 20 in the plug 19 of this container; and when this particular container is charged, the nozzle is lifted and the charged container taken away for the purpose of effecting a molding operation. The next adjacent empty container 17 is then immediately brought into proper position below the nozzle 13a and the nozzle is again brought downwardly in order to charge the second container. By providing an elongated heating chamber 23a it is possible always to maintain one or more containers at the desired temperature of preheat and in position for quick and ready substitution for the container being charged at any particular time.

It will be understood that in the arrangement of Figures 6 and 7 it is contemplated that the single nozzle 13a may be appropriately heated as by means of the kind of heater element mentioned above in connection with Figure 2. It is also preferred in arranging the mounting pivot 35 for the extruder unit to so locate the pivot that the center of gravity of the extruder unit lies between the pivot axis and the nozzle. In this way the weight of the extruder unit itself is utilized to retain the nozzle 13a in proper filling engagement with the filling apertures of the containers.

By virtue of the arrangement of Figures 6 and 7 the sequential filling of a multiplicity of containers from a single charging extruder is greatly simplified and the extruder can be continuously operated at a uniform rate, without any appreciable loss of the molten material, since the time involved in substituting an uncharged container for one which has just been charged is exceedingly short.

It will be understood that the arrangement of Figures 6 and 7 may be utilized either in the charging of intermediate containers or of molds themselves, according to the kind of molding operation being utilized.

I claim:

1. A method for forming articles from nylon comprising, continuously melting and advancing a column of nylon to provide a continuously flowing stream of molten nylon, delivering said stream to a first mold while substantially excluding contact of the molten nylon with air, the delivery being continued until said first mold is charged, substantially without interrupting the continuous flow of said stream delivering nylon from said stream to a second mold while substantially excluding contact of the molten nylon with air, continuing the delivery of molten nylon to the second mold until it is charged, applying pressure to the molten nylon in each mold upon the charging thereof and cooling the charged molds while maintaining the pressure.

2. A method for forming articles from nylon comprising, continuously melting and advancing a column of nylon in a nylon supply means to provide a continuously flowing stream of molten nylon, delivering said stream to a first intermediate chamber while substantially excluding contact of the molten nylon with air, the delivery being continued until said chamber is charged, substantially without interrupting the continuous flow of said stream delivering nylon from said stream to a second intermediate chamber while substantially excluding contact of the molten nylon with air, continuing the delivery of molten nylon to the second chamber until it is charged, delivering nylon from the first and second chambers to a first mold and a second mold respectively, applying pressure to the molten nylon in the chambers and thereby to the nylon in the first and second molds and cooling the charged molds while maintaining the pressure.

3. A method for forming articles from nylon comprising, continuously melting and advancing a column of nylon in a nylon supply means to provide a continuously flowing stream of molten nylon, sequentially charging a plurality of molds from said stream through intermediate chamber means while substantially excluding contact of the molten nylon with air, applying pressure to the molten nylon in the chamber means to develop pressure on the nylon in the charged molds, and cooling the charged molds while maintaining the pressure.

References Cited in the file of this patent

UNITED STATES PATENTS

| | | |
|---|---|---|
| 133,229 | Hyatt et al. | Nov. 19, 1872 |
| 1,560,368 | Bartels et al. | Nov. 3, 1925 |
| 2,253,810 | Poux | Aug. 26, 1941 |
| 2,273,188 | Graves | Feb. 17, 1942 |
| 2,304,461 | Knowles | Dec. 8, 1942 |
| 2,305,362 | Taylor | Dec. 12, 1942 |
| 2,309,729 | Gordon | Feb. 2, 1943 |
| 2,362,469 | Cousino | Nov. 14, 1944 |
| 2,467,107 | Bailey | Apr. 12, 1949 |
| 2,518,594 | Blanchard et al. | Aug. 15, 1950 |